(12) United States Patent
Stephens

(10) Patent No.: US 8,065,250 B2
(45) Date of Patent: Nov. 22, 2011

(54) METHODS AND APPARATUS FOR PREDICTIVE ANALYSIS

(75) Inventor: Christoper R. Stephens, Pedregal De San Nolas (MX)

(73) Assignee: Adaptive Technologies, Inc., Peoria, AZ (US)

( * ) Notice: Subject to any disclaimer, the term of this patent is extended or adjusted under 35 U.S.C. 154(b) by 955 days.

(21) Appl. No.: 12/029,083

(22) Filed: Feb. 11, 2008

(65) Prior Publication Data

US 2008/0208777 A1    Aug. 28, 2008

Related U.S. Application Data

(63) Continuation-in-part of application No. 09/504,939, filed on Feb. 16, 2000.

(60) Provisional application No. 60/889,055, filed on Feb. 9, 2007.

(51) Int. Cl.
*G06N 5/00* (2006.01)
(52) U.S. Cl. .......................... 706/45; 706/12
(58) Field of Classification Search .............. 706/45, 706/12
See application file for complete search history.

(56) References Cited

U.S. PATENT DOCUMENTS

| 5,706,406 | A | 1/1998 | Pollock |
| 5,920,848 | A | 7/1999 | Schutzer et al. |
| 2001/0049585 | A1 * | 12/2001 | Gippert et al. ................ 702/19 |

OTHER PUBLICATIONS

Yang et al ("Mobile Intelligent Agents for Document Classification and Retrieval: A Machine Learning Approach" 1998).*
Giacinto et al (Methods for Dynamic Classifier Selection Sep. 1999) download at http://www.diee.unica.it/~giacinto/PAPERS/ICIAP99.selection.pdf.*
William Raynor ("The international dictionary of Artificial Intelligence" 1999) only 3 pages.*

* cited by examiner

*Primary Examiner* — Jeffrey A Gaffin
*Assistant Examiner* — Lut Wong
(74) *Attorney, Agent, or Firm* — The Noblitt Group, PLLC

(57) ABSTRACT

Methods and apparatus for predictive analytics generally comprise one or more artificial agents and an agent factory. An artificial agent may be responsive to at least one of an internal data set and an external data set. Further, an artificial agent may produce a correlation data set relating an outcome data set and at least one of the internal data set and the external data set. In addition, an artificial agent may produce a predictability value corresponding to the correlation data set. The agent factory may be responsive to the outcome data set. Also, the agent factory may produce the artificial agent in response to the outcome data set.

18 Claims, 4 Drawing Sheets

METHODS AND APPARATUS FOR PREDICTIVE ANALYSIS

CROSS-REFERENCES TO RELATED APPLICATIONS

This application claims the benefit of U.S. Provisional Patent Application No. 60/889,055, filed Feb. 9, 2007, and is a continuation-in-part of U.S. Nonprovisional application Ser. No. 09/504,939, filed Feb. 16, 2000, and incorporates the disclosure of that application by reference.

BACKGROUND OF INVENTION

At least partial automation is being applied in a growing range of fields, improving the efficiency of industrial processes and raising productivity dramatically. The improvement has not been fully matched in the service sector, however, in part because many of the tasks carried out in the services industries are perceived to require intelligent reasoning and skills that are not easily emulated by machines.

Lack of automation is notable in areas traditionally associated with complexity and/or intuition. For example, although computers have greatly aided the process of processing financial information, it is still principally a human-based activity to interpret technical analysis charts and predict company performance. While automated algorithmic trading systems are becoming more popular, these systems are not true predictive systems since they rely, ultimately, on heuristic rules that cannot have global validity over time in a constantly changing financial market.

In many other fields, a relatively high level of automation has been achieved, such as in information storage, retrieval and communication. At the level of predictive analysis, however, automation is very rudimentary. The increasing demand in recent years for "predictive analytics" has been chiefly addressed with large analytic engines, such as those of SAS and SAP. Such analytics engines are essentially large, well equipped statistical tool boxes, but require significant training to use. Additionally, a user has to decide which statistical model is most appropriate for a given problem. When confronted by a choice of thousands of possible models, die user must either use expert human advice or develop the relevant skills to make a suitable judgment.

Furthermore, a model that is good for one aspect of analysis may be poor for another. For instance, neural networks can be very useful non-parametric statistical estimators that can lead to good predictive accuracy in a large variety of problems. Their outputs, however, may be opaque and therefore difficult to understand from, for example, a business perspective. On the other hand, association rules can be quite transparent, but may be suboptimal in terms of the precision of their predictions.

Such deficiencies are more than academic. In today's complex business world, problems are multi-faceted, addressing important prediction tasks such as—Who are my best customers? Where should a new sales office be located? When is a customer likely to change vendors? Associated with these different questions there is another—Why? An answer to each of the above however, gives only a partial solution to the overall problem of increasing the company's ROI or profit margins.

Each of the above is then a sub-problem, associated with a particular perspective, of the overall problem. Hence, solutions should be multi-faceted and multi-perspective, with solutions to sub-problems being combined together to form solutions at an aggregate level. This is precisely how teams of humans working together function—outputs from different sub-teams demonstrating expertise in a particular area being integrated together to give an overall solution.

Up to now, such high level cooperation and integration has been an exclusively human domain. For example, for a typical company, experts in marketing try to advertise a particular product line to stimulate demand, without necessarily having good predictive tools to understand how a particular marketing campaign can translate into demand. Meanwhile, another group has to plan the production that will satisfy the demand. Yet another group has to plan how to sell the product through different channels while another integrates all these different perspectives at a corporate level to assure that all the sub-teams are functioning within the framework associated with the company's overall goals. However, these goals have to be adjusted and adapted according to the constant feedback from the different sub-teams. Perhaps the production team cannot satisfy the demand generated by the marketing team for instance.

Artificial Intelligence is a relative newcomer to the field of predictive modeling and has held out the hope of providing automated systems that may one day substitute, at least partially, some of the high level tasks normally associated with humans. However, although there are now many systems available for prediction which may contain sophisticated elements such as neural networks and evolutionary algorithms, these systems may apply highly non-linear analysis and use computationally complex processes whose results can be highly unstable. Additionally, they do not necessarily offer predictions a priori but need to be "tuned" or "trained" by the user who almost inevitably is not an expert in artificial intelligence and, therefore, likely to produce unreliable results. Additionally, training of neural networks or optimization of genetic algorithm parameters, if done correctly, tend to be computationally intensive processes requiring computational resources and resources of time from the client that could better be dedicated to other tasks. Furthermore, typically, artificial intelligence applications have as their goal the solution of a very specific (sub)-problem. For instance, the IBM computer Deep Blue can play chess at the very highest level. However, it cannot do anything else. As emphasized above, in the real world, global "solutions" to real problems often require the simultaneous solution of many different sub-problems. On the forefront of artificial intelligence research are intelligent artificial agent systems which are now opening new avenues for productivity increases in areas where humans are carrying out repetitive intelligent tasks. This sets the stage for a new technological revolution that will change the way in which many services are rendered. Commercial applications of intelligent agents have essentially been restricted to "data mining" where a more intelligent search of databases is carried out. In fact many such systems are no more sophisticated than standard web search engines.

The use of analytical models may be complicated by factors such as a lack of data, too much data, and/or difficulty of determining a correlation between inputs and outputs. As to systems having a lack of data, this condition may arise due to a failure to properly record activity or difficulty of quantifying activity. For example, without detailed records of the behavior of financial instruments, it would be difficult to make any predictions regarding future trends. As another example, an advertising agency may have difficulty quantifying such concepts as brand loyalty, whether an ad is humorous, and/or the like. Accordingly, it may be difficult for an advertising agency to replicate past successes.

Analysis may be complicated by the sheer volume of data. For instance, a variety of predictive functions may be employed to produce an estimate of future activity. As the volume of data increases, it may become cumbersome to manually determine estimates based on the predictive algorithms.

In addition, in some systems correlations may be difficult to determine. For instance, accurately predicting whether a baseball prospect will be a future Hall of Frame player may be complicated by the difficulty of isolating indicia of future ability. As another example, predicting whether a condominium complex will be successful in a given area may be exceedingly difficult given the variety of factors relating to success.

While prediction is an increasingly analytical rather than intuitive process, even relatively quantitative systems of prediction may have substantial shortcomings. While sports scouts may make a living by predicting the future success of athletes based on a combination of statistical analysis and experience, the number of failed former first round draft picks would suggest that conventional scouting methods are not necessarily robust. In addition, that corporations frequently suffer decreased share prices due to overestimated earnings suggests that the predictive tools employed by even the biggest corporations do not operate with optimal accuracy.

SUMMARY OF THE INVENTION

In various representative aspects, the present invention includes a plurality of artificial agents and an agent factory. The artificial agents may be responsive to an input data set. The input data set may comprise at least one of an intake data set and an outcome data set. Each artificial agent may produce a correlation data set relating at least a portion of the outcome data set with at least a portion of the intake data set. Further, each artificial agent may produce a predictability value relating to the correlation data set. The agent factory may produce the plurality of artificial agents in response to the input data set.

BRIEF DESCRIPTION OF THE DRAWINGS

A more complete understanding of the present invention may be derived by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present invention.

DETAILED DESCRIPTION OF EXEMPLARY EMBODIMENTS

The present invention may be described in terms of functional block components and various processing steps. Such functional blocks may be realized by any number of hardware or software components configured to perform the specified functions and achieve the various results. For example, the present invention may employ various integrated circuit components, such as input-output systems, memory elements, processing elements, logic elements, matchable data structures, databases, and the like, which may carry out a variety of functions under the control of one or more microprocessors or other control devices. Further, the present invention may employ any number of conventional techniques for determining a correlation data set based on various input data sets, determining a predictability value, and/or the like.

Similarly, the software elements of the present invention may be implemented with any programming or scripting language such as, for example, C, C++, Java, COBOL, assembler, PERL, eXtensible Markup Language (XML), etc., or any suitable programming or scripting language now known or later developed, with the various functions being implemented with any combination of data structures, objects, processes, routines or other programming elements. Further, the present invention may employ any number of conventional techniques for data transmission, signaling, data processing, network control, and the like.

Various representative implementations of the present invention may be applied to any system for data processing and/or analysis, particularly where it is important to integrate information across different perspectives and also to adapt outputs according to new input information. Certain representative implementations may include, for example, predicting movements in stock price, predicting execution rates for trades, predicting healthcare costs for cohorts of insured individuals and profiling those most suitable to be put into a care program, predicting which potential clients are most appropriate for a given product offering while simultaneously determining which current clients are most appropriate for a given up-sell or cross-sell, predicting and profiling those most suitable for leadership positions in an organization, or predicting which transactions, such as credit card or healthcare claims, are fraudulent.

Figure 1:
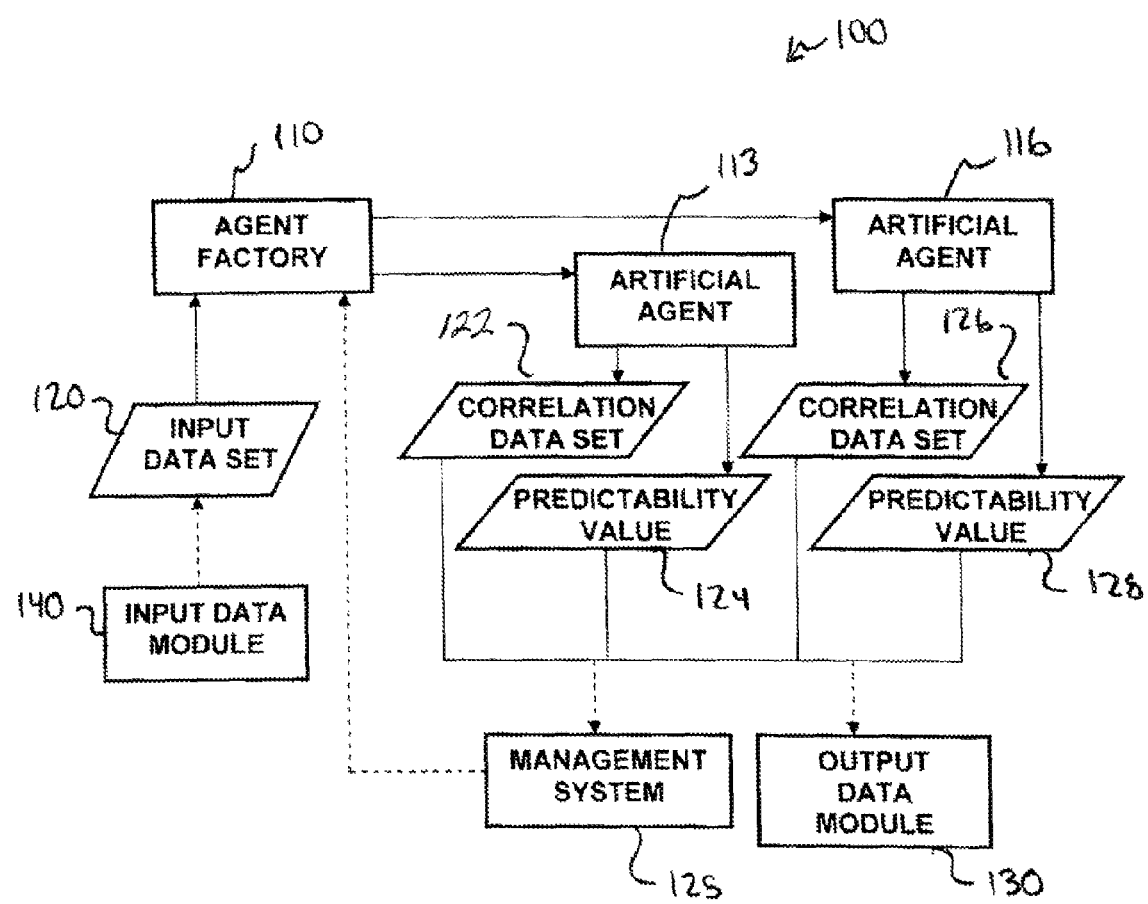
FIG. 1 representatively illustrates an embodiment of the present invention comprising an agent factory and a plurality of artificial agents.

Methods and apparatus according to various aspects of the present invention operate in conjunction with a predictive modeling system that generates projections using artificial agents. Referring now to FIG. 1, a predictive modeling system 100 according to various aspects of the present invention comprises an agent factory 110 and one or more artificial agents 113, 116. The agent factory 110 receives an input data set 120 and may generate the artificial agents 113, 116. Each artificial agent 113, 116 may process at least a portion of the input data set 120 and produce a correlation data set 122, 126 and a predictability value 124, 128.

In an exemplary embodiment, the input data set 120 is transmitted to the agent factory 110 via an input data module 140. The artificial agents 113, 116 analyze the input data set 120, and each artificial agent 113, 116 produces a correlation data set 122, 126 and a predictability value 124, 128. The artificial agent 113, 116 may be activated and/or retired at the direction of a management system 125. In addition, the data processed and/or generated by the agents 113, 116 may be provided to an output data module 130.

The predictive modeling system 100 may comprise and/or implement any system for manipulating data, such as a non-linear regression model included within a software program, a microprocessor embedded within a circuit board, and/or the like. In the present embodiment, the predictive modeling system 100 comprises one or more computers running a program to perform the analyses and other tasks. The various aspects of the predictive modeling system 100 may be implemented in any appropriate manner, however, including hardware and/or software, and may operate on a single computer system or may be distributed across multiple computers.

In the present embodiment, the input data module 140 provides the input data set 120, for example to the agent factory 110. The input data module 140 may comprise any system to provide, receive, store, and/or transmit data. In the present embodiment, the input data module 140 comprises an electronic system and/or software to receive data from external sources, store data, and transmit data to other elements of the predictive modeling system 100.

The input data module 140 may collect and/or receive information from any suitable source and manner, such as via an automatic feed, automatically requesting data from other sources, prompting a user for data entry, and the like. For example, the input data module 140 may receive the input data set 120 via a computer system to receive instructions and data from a user, for example via conventional data entry or accessing a memory and/or database. The user may be directed to select from a menu of trading instructions or otherwise provide instructions in a manner suited to analysis within the predictive modeling system 100. Further, the input data set 120 may be input via a portable memory device such as a magnetic or optical memory, a flash drive, an external hard drive, and/or the like.

The input data module 140 may transmit the input data set 120 to the agent factory 110. The manner in which the input data set 120 is transmitted may be adapted to the application and/or environment of the predictive analysis system 100, for example in response to queries from the agent factory 110, at regular intervals, upon receipt and assembly of information, and/or based on importance according to selected criteria. The input data module may provide the input data set 120 as well as any other appropriate information, such as task identification information, setup parameters, or other information that may be relevant to the required analysis.

The input data set 120 may comprise various data points relating to behavior of a system with which to determine and project the future behavior of the system. For example, the input data set 120 may comprise an intake data set and an outcome data set. The intake data set may comprise information regarding the initial state of various subjects or systems, and the outcome data set may comprise information regarding the subjects or systems after the passage of time or exposure to particular conditions. The predictive modeling system 100 may identify correlations between the intake data set and the outcome data set. The correlations may then be used to evaluate the second cohort.

For example, the input data set 120 for a first cohort may relate to a single cohort of diabetic healthcare insureds. The intake data set may comprise information about the medical conditions, medical costs, and socio-demographic data of the cohort in the past year, while the outcome data set may comprise information about the cohort and the members of that cohort at a later time. Through analysis of the first cohort, a series of relationships may be determined and quantified, such as a relationship between the expected future medical costs of an individual as related to their past medical conditions and costs. Through application of the quantified series of relationships to an intake data set for a second cohort, the future activity of the second cohort may be estimated. The input data set 120 may be continuously updated to include newly gathered data, for in an adaptive situation, the statistical relationships discovered at one time may not be valid at a later time.

In an additional example, when trying to identify future organizational leaders and the value of company training programs on producing such leaders, the input data set 120 may comprise information for a cohort of employees before and after taking the relevant training courses. Information for the cohort before taking the courses may be included within an intake data set. The intake data set may include information specific to an employee such as sex, race, education, job evaluation, peer/supervisor/supervisee evaluations, etc. The outcome data set may include information for the cohort after the training courses, for example data relating to the success of that cohort and its members. The outcome data set may include similar information to the intake data set, which by a comparison between the two may be used to determine which interventions—training courses—were most suitable for a particular profile. Additionally, one may determine which leadership "gaps" may be filled by a particular course.

As another example, the input data set 120 may relate to marketing, and may comprise data sets relating to media mix. The intake data set may comprise information specific to various media offerings, such as whether the product was advertised by television, Internet, radio, or magazine. The intake data set may include further relevant information. For example, if an advertisement was offered by television, the intake data set may include the time and geographical areas in which the television advertisement was shown. The intake data set may also comprise information relating to the circumstances of the cohort that was targeted by the marketing, such as unemployment rate, income, education, family size, as well as other macroeconomic variables, such as inflation, long-term interest rates, and/or the like.

The outcome data set may comprise information specific to each advertisement, such as whether sales increased following the advertisement's introduction, whether an advertisement developed cultural significance, negative commentary toward the advertisement, and/or the like. The outcome data set may also comprise information relating to the circumstances of the cohort, such as the unemployment, interest rates, pandemics, and/or the like. To the extent that a quantified correlation is defined with regard to the first cohort, the fate of a second cohort of advertisements may be predicted. For example, the system 100 may determine that an advertisement for waffle irons is likely to result in 20% higher sales if it includes the celebrities dressed in the color yellow and interest rates stay below 6%.

In the present embodiment, the input data set 120 is configured to determine the future prospects of potential college students from the perspective of an educational institution. Accordingly, the input data set 120 comprises information for at least one first cohort and information for a second cohort. The portion of the input data set 120 relating to the first cohort includes an intake data set and an outcome data set. The intake data set may comprise information relating to each student that has expressed interest in attending the college. Such information may include information specific to a potential student such as age, name, race, zip code, education level, military experience, socioeconomic status, cultural background, religion, credit history, and/or the like. Such information may also include information relating to the circumstances of the cohort, such as tuition level at the college, interest rates, unemployment, and/or the like.

The outcome data set may include information relating to the circumstances of each potential student some time later. For example, outcome data set may include information such as whether the potential student enrolled, graduated, found a job relating to the field of study after graduation, is now a donating alumnus, how much the potential student's attendance was worth to the college, and/or the like. The outcome data set may also include information about unemployment rates, interest rates, and/or the like.

The predictive modeling system 100 may be configured to determine a correlation between the intake data set and the outcome data set with which to evaluate the second cohort. For example, the predictive modeling system 100 may determine that students under twenty years old with at least a high school diploma and a high SAT score are likely to enroll, graduate, make use of their degree following graduation, and donate. Through use of the predictive modeling system 100, those potential students who are more likely to be "successful" from the perspective of the college may be targeted and resources allocated accordingly.

The artificial agents 113, 116 may receive data, analyze the data, and produce predictions, data, advisories, and/or other information, and/or may perform additional tasks, such as requesting additional information or executing trades. In the present embodiment, correlations and/or estimates relating to future behavior may be determined and/or quantified via one or more of the artificial agents 113, 116. The artificial agent 113, 116 may comprise any system for analyzing data, such as a software program embedded within one or more computer readable media. In the present embodiment, the artificial agent 113 comprises a software program configured to produce the correlation data set 122 based on the input data set 120. Further, the artificial agent 113 may produce the predictability value 124, for example to quantify the accuracy of the correlation data set 122 and thus the predictions of the artificial agent 113. Additionally, the artificial agent 113 may produce an estimated outcome data set relating one or more portions of the intake data set to the correlation dataset 122.

The artificial agents 113, 116 generate projections based on at least portions of the input data set 120, for example data corresponding to a second cohort, and selected algorithms or other criteria, for example selected statistical analyses or theories. In the present embodiment, the artificial agents 113, 116 may predict whether potential students or student markets fitting selected criteria are likely to succeed based on analyses of prior cohort data and/or other relevant data, such as related educational or economic conditions. For example, each artificial agent 113, 116 may apply a statistical analysis technique, such as a nonlinear regression model, or implement an artificial intelligence element, such as a neural network, to determine a set of indicia to identify student types that are most likely to achieve selected outcomes.

The artificial agents 113, 116 may comprise any systems for processing data, such as a software programs, hardware systems, or other processing elements. In the present exemplary embodiment, the artificial agents 113, 116 are computer programs, such as artificially intelligent programs, that generate projections and estimates of market conditions and provide trade execution strategies according to the projected or estimated market conditions. Each artificial agent 113, 116 may comprise a software program configured to process the input data set 120 to determine the estimated data set 122 and the predictability value 124.

Each artificial agent 113, 116 operates in conjunction with one or more algorithms, data analysis programs, strategy programs, and/or the like selected from a library of such algorithms and/or programs. In the present embodiment, the library is accessed via the agent factory 110. Accordingly, the first artificial agent 113 may comprise a first data analysis program and the second artificial agent 116 may comprise a second data analysis program.

In addition, through the use of multiple artificial agents 113, 116, various portions of the input data set 120 may be analyzed and various estimates regarding student success may be developed. For example, the first artificial agent 113 may be configured to analyze the input data set 120 according to a first data analysis technique and the second artificial agent 116 may be configured to analyze the input data set 120 according to a second data analysis technique. The first artificial agent 113 and the second artificial agent 113 may produce different correlation data sets 122, 126 based on the differing data analysis techniques. The artificial agents 113, 116 may also develop predictability the values 124, 128, facilitating selection of the more useful predictive model.

The correlation data set 122 identifies relationships between intake data sets and outcome data sets. The correlation data set 122 may comprise any appropriate information, such as a quantified set of relationships between data points within one or more intake data sets and data points within one or more outcome data sets. Through application of various analytical techniques, a model for the relationship between an intake data set and an outcome data set may be determined and identified as a correlation data set 122. Using one or more artificial agents 113, 116 to process data according to at least one analytical technique selected from a library of analytical techniques may allow various statistical techniques to be applied and various correlation data sets 122, 126 to be developed.

For example, for an analysis of potential students, the correlation data set 122 may indicate that the strongest indicia of future donating alumni are qualification for an athletic scholarship, alumni among immediate family, and fraternity members among immediate family. Further, the correlation data set 122 may indicate that the weakest indicia of future donating alumni are distance of zip code, lack of athletic activity as reported on the college application, and a credit score above a specified threshold. The correlation data set 122 may include data identifying each of the relevant variables and a coefficient indicating the strength of the relationship between the variable and the outcome. Accordingly, a college may focus its recruitment activities on potential students having the positive identifiers and reduce such activities toward students having the negative identifiers.

Whereas the correlation data set 122 quantifies a predictive relationship, the predictability value 124 quantifies the accuracy of that predictive relationship. The predictability value 124 may be a data set quantifying the predictive value of an artificial agent 113. Each artificial agent 113, 116 may be configured to produce the corresponding predictability value 124, 128 quantifying the accuracy of the analysis of that artificial agent 113, 116.

The predictability value 124 may be assigned to each agent using absolute and/or relative numerical assignments. For example, the first artificial agent 113 may determine that the first artificial agent 113 has predicted outcome data sets with 95% certainty. Accordingly, the absolute predictability value 124 for the first artificial agent 113 may be 95. The second artificial agent 116 that predicted outcome data sets with 80% certainty may be assigned the predictability value 128 of 80. To determine the relative predictability value 124, 128, each artificial agent 113, 116 may be configured to rank itself with respect to the every other artificial agent 113, 116. For instance, an average predictability value and the standard deviation of such predictability values may be determined for all artificial agents 113, 116 and the relative predictability value 124, 128 assigned accordingly.

The predictability value 124 may be based on mutual information-based reconstruction of a multivariate fitness landscape 300, which evaluates the ability of an artificial agent 113 to generalize into the future. Landscape reconstruction may be employed to establish the correlation between the past performance of an artificial agent 113 and its expected future performance. "Predictability" may be defined as the statistical expected value of a target variable that measures future performance, such as the agent's 113 predictive accuracy for the next 1000 members of a cohort, the agent's 113 predictive accuracy for the next six months, or other performance measure. A predictability landscape 300 may be developed by performing a large number of experimental agent runs using historical data and comparing the expected outcome with the actual outcomes.

The predictability value 124 may make use of an estimated outcome data set. An estimated outcome data set may be projected data based on one or more intake data sets and correlation data sets 122. The artificial agent 113 may be configured to process at least a portion of an intake data set using the correlation data set 122 to determine an estimated outcome data set. For example, the correlation data set 122 may comprise a quantified relationship between a first intake data set and a first outcome data set. A second intake data set may be processed with that correlation data set 122 to determine an estimated outcome data set.

In addition to determining an estimate of future activity using an estimated outcome data set, the estimated outcome data set may be employed to produce the predictability value 124. For example, the input data set 120 may comprise a first cohort and a second cohort to be processed by the artificial agents 113, 116. The first cohort comprises an intake data set and an outcome data set. The second cohort comprises only an intake data set. Accordingly, the correlation data set 122 may be produced by processing the first cohort. An estimated data set may be developed by processing the intake data set of the second cohort in view of the correlation data set 122. In the event that an outcome data set becomes available for the second cohort, that outcome data set may compared against the estimated outcome data set to determine the predictability value 124 of the correlation data set 122 and thus of the artificial agent 113. The process may be repeated over multiple artificial agents 113, 116 to determine respective predictability values 124, 128.

Via the estimated outcome data set, the artificial agent 113 may predict future behavior. Estimated outcome data sets may be combined to produce an average or overall estimated outcome data set. For example, one or more artificial agents 113, 116 may be determine correlation data sets 122, 126 with comparatively high predictability values 124, 128. In the event that the correlation data sets 122, 126 include distinct correlations, the distinct correlations may be combined into an aggregate correlation data set 122. Accordingly, aberrations within a single artificial agent 113 may be mitigated.

The artificial agents 113, 116 may be generated by the agent factory 110. The agent factory 110 may comprise any system for analyzing data, such as a hardware system, a software system, and/or the like. In the present embodiment, the agent factory 110 comprises a library of analytical techniques, such as various regression techniques, Bayesian models, and/or the like, with which to analyze at least subsets of the input data set 120. As an example, the agent factory 110 may generate sufficient numbers of artificial agents 113, 116 such that every portion of every intake data set is analyzed against every portion of every corresponding outcome data set using every analytical tool to produce every possible correlation data set 122, 126.

The agent factory 110 may comprise multiple subroutines to generate one or more artificial agents 113, 116 and provide the one or more artificial agents 113, 116 with a processing subroutine. For example, the agent factory 110 may comprise the following software routines: 1) data, 2) run agents, 3) refresh, 4) trends, 5) test, 6) quality, 7) temp, and 8) select.

The "data" software routine may receive at least one input data set 120. For example, the "data" routine may request an input data set 120, organize incoming an incoming input data set 120, and/or provide such incoming data to at least one artificial agent 113.

The "run agents" software routine may activate one or more artificial agents 113, 116 to determine and/or update at least one correlation data set 122 and/or at least one predictability value 124. The "run agents" software routine may be automatically activated following a specified fluctuation in at least one data point within an input data set 120.

The "refresh" software routine may identify artificial agents 113, 116 that have been marked as "retired", mark retired artificial agents 113, 116 as placed within a "cemetery" database, and/or activate retired agents 113, 116 that have a comparatively higher predictability value 124. In addition, the "refresh" routine may be configured to activate previously retired agents 113, 116 so as to provide a wide range of data analysis techniques.

The "trends" software routine may identify trends among the correlation data sets 122, 126, for example, using non-linear consensus rules that identify teams of two or more artificial agents 113, 116 having related correlation data sets 122, 126. As an example, a first artificial agent 113 may produce a first correlation data set 122 and a relatively high predictability value 124. A second artificial agent 113 may produce a second correlation data set 126 indicating a similar correlation with a relatively high predictability value 128. The "trends" routine may identify such artificial agents 113, 116. Further, if any artificial agents 100 are outliers as determined by the "trends" routine, such information may be used by the "refresh" routine, for example, to retire outlying artificial agents 113, 116.

The "test" software routine may determine performance statistics for the predictive modeling system 100, for example, by determining the percentage of artificial agents 113, 116 that produced correlation data sets 122, 126 having predictability values 124, 128 higher than random selection. For example, the correlation data sets 122, 126 produced by the predictive modeling system 100 may be determined to be ten times more accurate than randomly assigning correlation data sets.

The "quality" software routine may determine that each parameter of every artificial agent 113, whether active, new, or retired, has the appropriate format and is within lower and upper bounds to ensure that every artificial agent 113 will perform according to a user's expectations.

The "temp" software routine may be a predictive modeling technique analyzer configured to test the effectiveness of various predictive modeling techniques over a specified timeframe and evaluate the predictability of each predictive modeling technique.

The "select" software routine may identify accurate predictive modeling techniques among those determined as highly predictive by the "temp" routine and select a subset of such predictive modeling techniques that are comparatively predictable and/or satisfy diversity enforcement criteria that, for example, avoid repeating techniques that are already being used by previously-created artificial agents 113, 116.

The predictive modeling system 100 may further include an output data module 130, for example to store, present, transmit, or otherwise use the data of the predictive modeling system 100. The output data module 130 may comprise any system for receiving various data, such as the correlation data sets 122, 126, predictability values 124, 128, estimated data sets, and any other appropriate data generated by the predictive modeling system 100. The output system 130 may perform any appropriate functions for transferring the data to other systems or users, such as storing, transmitting, presenting, or otherwise using the data.

In the present embodiment, the output data module 130 comprises memory to store data and a display system to display at least a portion of the output of the predictive modeling system 100. For example, the output data module 130 may display at least a portion of the correlation data sets 122, 126 generated by the fifty artificial agents 113, 116 having the highest predictability values 124, 128. The display may provide a user with a various correlations and the strength of each.

The output data module 140 may comprise various systems and/or subsystems. For example, the output data module 140 may also or alternatively comprise a printing system to print the data generated by the predictive modeling system 100. As another example, the output data module 140 may comprise a graphical user interface for navigating and/or selectively displaying estimated data sets 122, 126. Further, the output data module 140 may comprise an interface with which a user may selectively review and explore the results of the predictive modeling system 100.

The management system 125 may monitor and/or control various functions of the predictive modeling system, such as controlling the agents 113, 116 generated by the agent factory, analyzing results of the artificial agents such as the correlation data sets 122, 126 and the predictability values 124, 128, or otherwise managing operations of the predictive modeling system 100. For example, the management system 125 may monitor and selectively retire underperforming artificial agents 113, 116. The management system 125 may comprise any system and/or criteria to evaluate the artificial agents 113, 116, for example based on the agent's 113, 116 predictability value 124, 128.

The management system 125 may be separate from or integrated into the agent factory 110. In the present embodiment, the management system 125 monitors the predictability values 124, 128 of each agent 113, 116 and selectively retires any agent 113, 116 with a predictability value 124, 128 below a selected threshold or meeting other relevant criteria. By retiring underperforming agents 113, 116, the management system 125 may optimize processing efficiency of the predictive modeling system 100.

The management system 125 may also selectively activate retired agents 113, 116. For example, the management system 125 may activate a previously retired agent 113, 116 for a specified duration to determine whether that agent 113, 116 has an associated predictability value 124, 128 above a certain threshold. Because the input data set 120 may fluctuate, an underperforming artificial agent 113, 116 may become a well-performing artificial agent 113, 116 for a different input data set 120.

Figure 2:
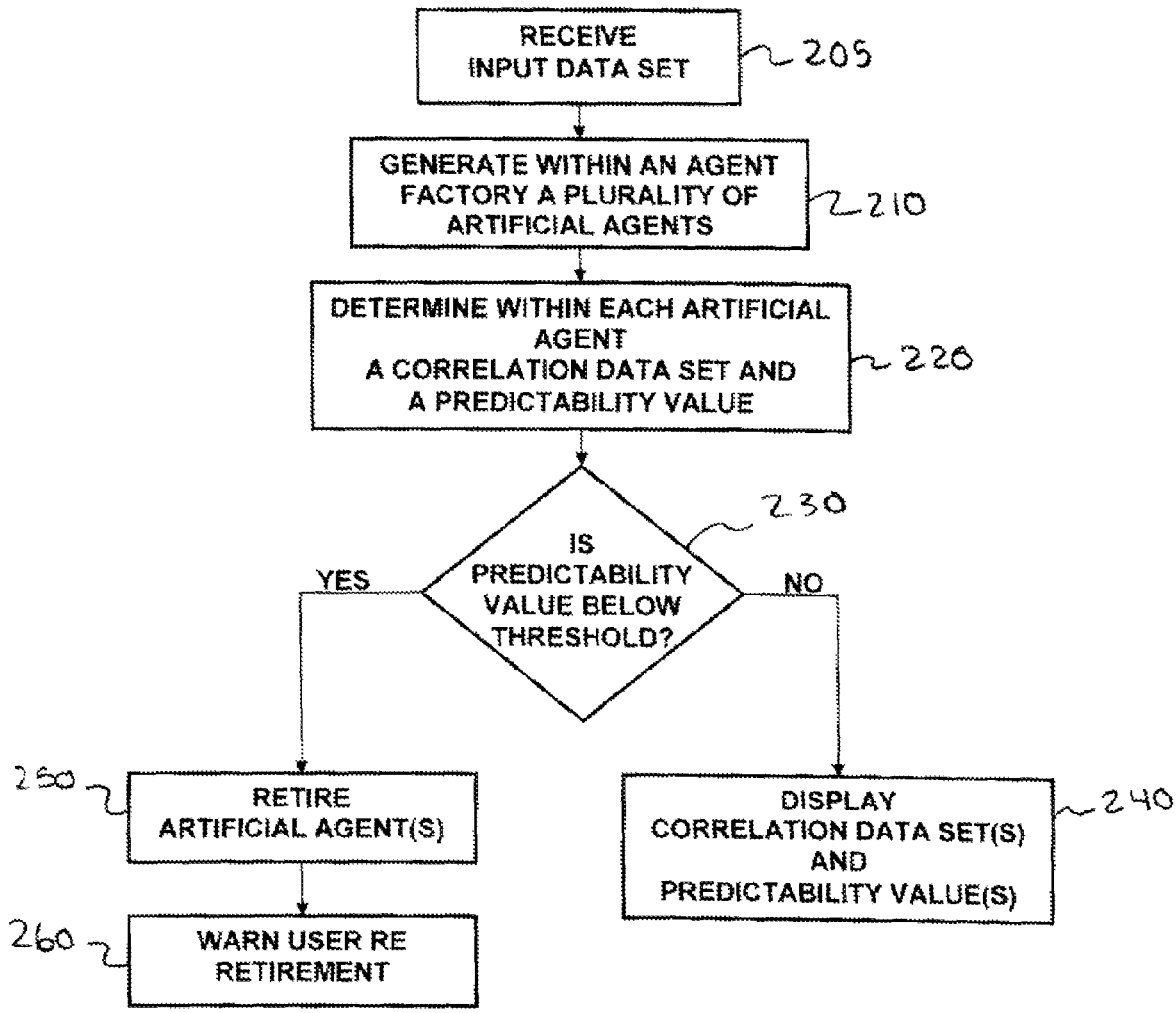
FIG. 2 representatively illustrates a flowchart displaying operation of a predictive modeling system.

In operation, the input data set 120 is provided to the agent factory 110, which provides the relevant data to the various artificial agents 113, 116. An input data set 120 may be analyzed according to various methods, techniques, and/or subroutines. A method for processing the input data set 120 may involve various techniques, such as non-linear regression analysis, Bayesian models, and/or the like as well as various systems and devices such as a microprocessor, magnetic data storage, and/or the like. Referring to FIG. 2, in the present embodiment, the input data set 120 may be received by agent factory 110, which generates and/or activates artificial agents 113, 116 (210). The artificial agents 113, 116 may produce the correlation data sets 122, 126 and predictability values 124, 128 (220). Each predictability value 124, 128 may be compared with a threshold value (230). If the predictability value 128 is at least as high as the threshold value, the correlation data set 124 and predictability value 128 may be output to the user (240). If the predictability value 124 is lower than the threshold value, the artificial agent 113 that generated that predictability value 124 may be retired (250). Retirement of the artificial agent 113 may produce a corresponding output to the user regarding such retirement (260).

More particularly, the input data set 120 may be initially received from the input data module 140 and provided to the agent factory 110. For example, the input data set 120 may be transferred from a storage medium into the input data module 140 via cable, wireless transfer, data entry, or other appropriate method. In the present embodiment, the input data set 120 is provided to the agent factory 110 via a connection between the agent factory 110 and the input data module 140. If the agent factory 110 is distributed over multiple networked devices, the input data set 120 may be provided through communication with the input data module 140 likewise distributed over multiple networked devices.

Providing the input data set 120 may include any appropriate systems and processes. For example, the input data set 120 may comprise information that is not ready for processing by the agents 113, 116. Accordingly, the input data module 140 and/or the agent factory 110 may process the input data set 120, for example by reformatting the input data set 120. Additionally, the parameters of the input data set 120 may be identified before data within the input data set 120 can be compiled and/or formatted. As an example, it may necessary to develop, distribute, and/or process historical cohort data prior to processing the data.

Upon receipt of the input data set 120, the agent factory 110 may create and/or activate one or more of the artificial agents 113, 116 to process the input data set 120 (220). Each artificial agent 113, 116 may be generated within the agent factory 110 according to various methods, techniques, and/or subroutines. For example, each artificial agent 113, 116 may be generated according to various subroutines, such as "run agents" comprising the agent factory 110. Further, each artificial agent 113, 116 may be preexisting and activated in response to receipt of the input data set 120.

In the present embodiment, each agent 113, 116 is generated by assigning a predictive modeling technique to evaluate a portion of the input data set 120. Such assignment may take into consideration whether a predictive modeling technique has already been employed within another agent 116, whether a class of predictive modeling techniques has already been employed within another agent 116, and/or other scenarios to maximize the efficiency of the system 100.

Each artificial agent 113, 116 processes the input data set 120 to produce a corresponding correlation data set 122, 126 and predictability value 124, 128. The correlation data set 122, 126 and the predictability value 124 may be determined via the artificial agent 113 as generated by the agent factory 110 and/or managed by the management system 125.

The correlation data set 122 may be produced according to various methods, techniques, and/or subroutines. For example, an artificial agent 113 may run a regression analysis to determine the relationship between alumni giving by graduated students and the average income of the parents of those alumni when they were potential students. Accordingly, the artificial agent 113 may estimate that there is a substantial relationship as regards a specified parental income level. When the predicted behavior is processed against the actual behavior, however, this predicted relationship may not provide a useful relationship in practice. Accordingly, a predictability value 124 may be assigned for the correlation data set 122 to quantify the usefulness of the predicted relationship.

The predictability value 124 may be determined in according to any suitable criteria, process, or technique. For example, the predictability value 124 may be determined by producing a statistical error term, such as the coefficient of determination, that is reflected in the correlation data set 124 relative to a first intake data set and a first outcome data set.

As another example, the predictability value 124 may be determined by generating a predictability landscape. Landscape reconstruction is one exemplary embodiment of a process for analyzing past data and determining the predictability value 124, 128 for each agent 113, 116. More specifically, landscape reconstruction may quantify the agent's 113 expected future predictability.

To reconstruct the predictability landscape, a large number of experimental agent runs using historical data may be performed. For example, as applied to a financial instrument, each agent run may comprise:

1) Choosing or creating an agent 113, 116 including a specified analytical technique to determine a correlation data set 122 based on a first intake data set and a first outcome data set.

2) Computing the estimated outcome data set that the agent 113 would have produced using the correlation data set 122 as applied to a second intake data set.

3) Computing the estimated outcome data set that this agent 113 would have produced using the correlation data set 122 as applied to a third intake data set.

4) Writing to a database:

(a) The characteristics that represent the class of analytical techniques being applied, i.e., the analytical technique that the agent 113 is using.

(b) The value of various variables describing the input data set 120, such as age, height, weight, credit score, zip code, previous education level, unemployment, tuition level, alumni donations, and/or the like.

(c) The value of variables that represent the correlation data set 122, such as a correlation between alumni giving and previous education level, a correlation between graduation and credit score, and/or the like.

(d) The value of various estimated outcome data sets.

5) Repeat steps 2-4 for different intake data sets.

6) Repeat steps 1-5 for different agents 113, 116 having different analytical techniques.

The outcome of steps 1-6 is a large database, D, of experimental runs giving, for each run, information on agent 113 type, the correlation data set 122, and the estimated outcome data set.

Figure 4:
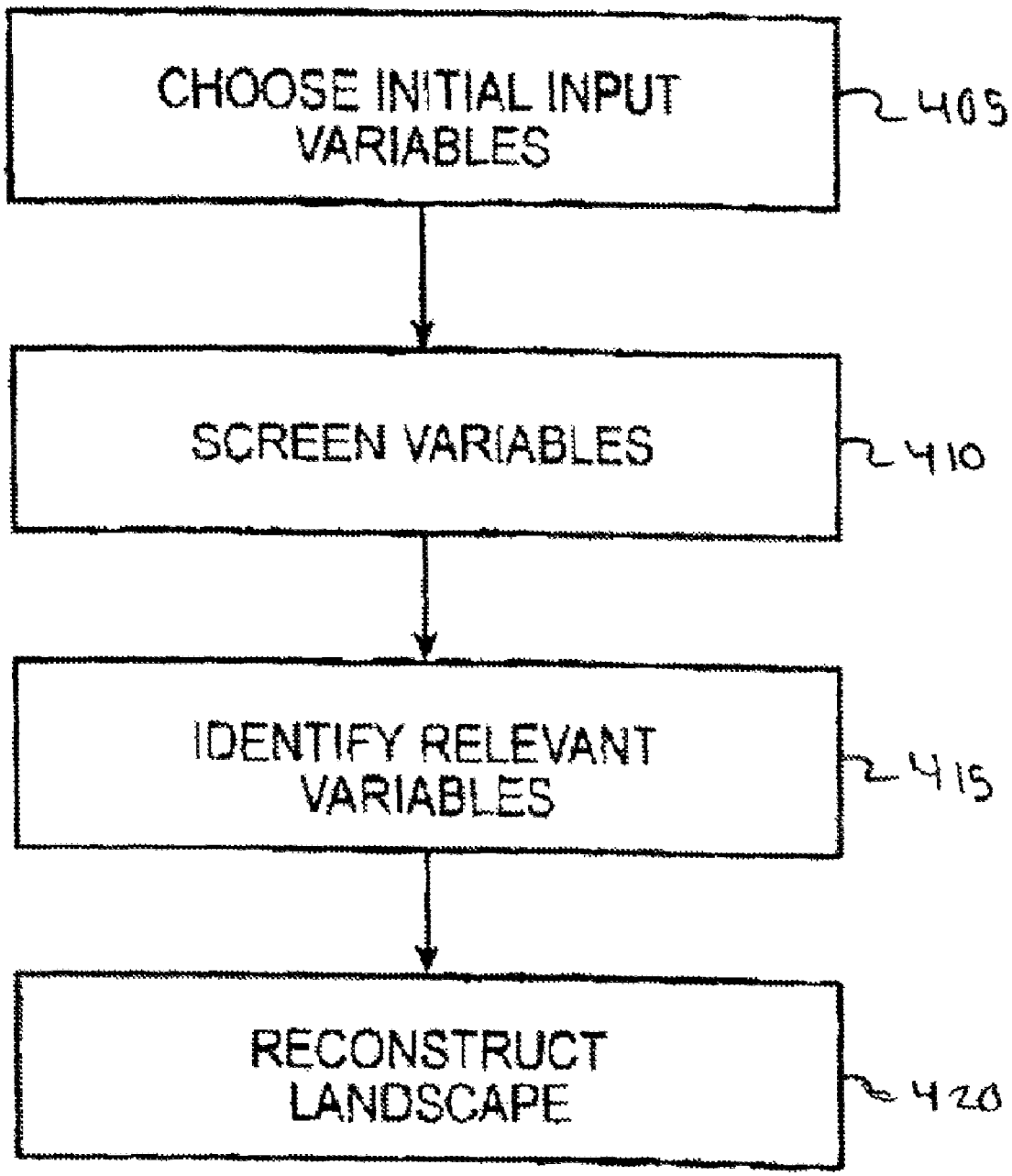
FIG. 4 representatively illustrates a method of determining a predictability value via a data landscape.

The landscape reconstruction process inputs information from this database and performs the following steps as illustrated in FIG. 4:

1) Choose at least a portion of an intake data set and at least a portion of an outcome data set (405).

2) Select screening criteria (410) on the variables such that each has a more limited domain. For example, a correlation data set 122 may indicate that some portions of an intake data set have no correlation with any portion of an outcome data set. Accordingly, such members of the intake data set may be eliminated prior to landscape reconstruction.

3) Identify relevant variables (415). In one embodiment, a subset of an intake data set that correlates strongly and robustly with the outcome data set over a given time period may be identified. For instance, a data set within an outcome data set may be approximately linearly related to a data set within a particular intake data set over many different testing windows. The data set within the outcome data set may indicate no significant correlations over time with respect to another set of data points. The former would be considered a relevant variable and the latter an irrelevant one.

4) A space S may be formed by the identified set of relevant variables over the limited domains. A landscape reconstruction may be performed (420) by dividing the space S into elementary cells and assigning a predictability to each cell as the average of the predictabilities associated with the subset of D that corresponds to that cell. Once the predictability landscape has been fixed, any new analytical technique can be assigned a predictability value 124 by determining in which cell the analytical technique fits and assigning the associated predictability value 124.

Figure 3:
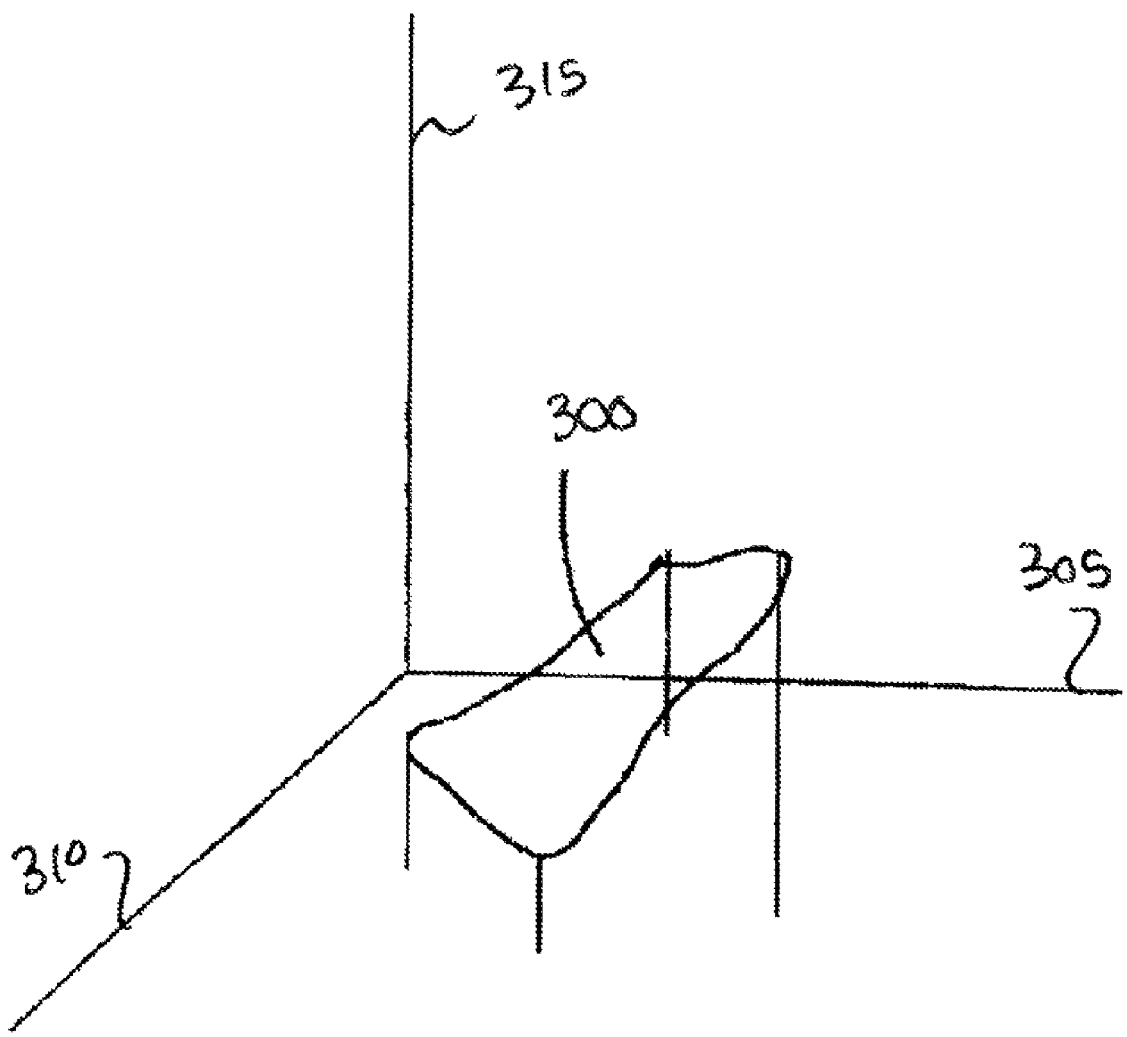
FIG. 3 representatively illustrates a data landscape.

Referring to FIG. 3, a simple landscape reconstruction may include horizontal axes 305, 310 corresponding to selected data points within the input data set 120. A vertical axis 315 corresponds to a set of predictability values 124 as determined via the landscape reconstruction 300 associated with each data point.

Each predictability value 124, 128 may be compared with a threshold value (230). The predictability value 124 may be compared against any appropriate threshold value. For example, the management system 125 may be configured to compare the predictability value 124 of each artificial agent 113 to a specified minimum threshold value. If the predictability value 128 is at least as high as the threshold value, the correlation data set 124 and predictability value 128 may be provided to the output data module 130 (240). If the predictability value 124 is lower than the threshold value, the artificial agent 113 that generated that predictability value 124 may be retired (250).

To retire the agent, 113, 116, the artificial agent 113, 116 may be disabled. For example, the artificial agent 113 may be at least temporarily retired with regard to analysis of the input data set 120. However, in the event of a substantial change to the input data set 120 or the introduction of a new data set, the artificial agent 113 may be activated to determine a new estimated data set 122 and a new predictability value 124.

Each correlation data set 122, 126 and each predictability value 124, 128 may be provided to the output data module 130. The output data module 130 may provide the user with a formatted output screen displaying the correlation data set 122, 126 and/or the predictability value 124, 128 as produced by multiple artificial agents 113, 116.

The user may be warned about retirement of an artificial agent 113 (260). For example, the output data module 130 may receive a signal from the management system 125 regarding retirement of an artificial agent 113. In response to the signal, the output data module 130 may display such information as in a spreadsheet, graphically, and/or the like.

The particular implementations shown and described herein are illustrative of the invention and its best mode and are not intended to otherwise limit the scope of the present invention in any way. Indeed, for the sake of brevity, conventional data networking, application development and other functional aspects of the systems (and components of the individual operating components of the systems) may not be described in detail. Furthermore, the connecting lines shown in the various figures contained are intended to represent exemplary functional relationships and/or physical couplings between the various elements. Many alternative or additional functional relationships or physical connections may be present in a practical system.

The present invention may be embodied as a method, a system, a device, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The present invention is described with reference to block diagrams and flowchart illustrations of methods, apparatus (e.g., systems), and computer program products according to various aspects of the invention. Each functional block of the block diagrams and the flowchart illustrations, and combinations of functional blocks in the block diagrams and flowchart illustrations, respectively, may be implemented by computer program instructions. These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks.

The computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

In the foregoing specification, the invention has been described with reference to specific exemplary embodiments. Various modifications and changes may be made, however, without departing from the scope of the present invention as set forth in the claims. The specification and figures are illustrative, rather than restrictive, and modifications are intended to be included within the scope of the present invention. Accordingly, the scope of the invention should be determined by the claims and their legal equivalents rather than by merely the examples described.

For example, the steps recited in any method or process claims may be executed in any order and are not limited to the specific order presented in the claims. Additionally, the components and/or elements recited in any apparatus claims may be assembled or otherwise operationally configured in a variety of permutations and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

As used herein, the terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

The invention claimed is:

1. A non-transitory computer-readable medium containing instructions for causing a computer system to process data according to a predictive modeling system, the predictive modeling system comprising:
   a plurality of artificial agents responsive to an input data set, wherein:
      at least one artificial agent comprises a predictive algorithm;
      the input data set comprises at least one intake data set and at least one outcome data set, wherein:
         a first intake data set corresponds to a set of factors for a first cohort at an initial state in time; and
         a first outcome data set corresponds to a change in the set of factors for the first cohort after a passage of time;
      each artificial agent produces a correlation data set relating at least a portion of the first outcome data set with at least a portion of the first intake data set for predicting a future change to a second cohort over a second passage of time based on a second intake data set corresponding to a second set of factors for the second cohort at a second initial state in time; and
      each artificial agent produces a predictability value for quantifying an accuracy of the correlation data set produced by the artificial agent; and
   an agent factory responsive to the input data set, wherein the agent factory produces the plurality of artificial agents in response to the input data set.

2. A non-transitory computer-readable medium according to claim 1, wherein:
   the input data set comprises a second outcome data set corresponding to an actual change in the second set of factors for the second cohort after the second passage of time;
   the input data set further comprises a third intake data set corresponding to a set of factors for a third cohort at a third initial state in time;
   each artificial agent:
      relates at least a portion of the second intake data set with at least a portion of the second outcome data set;
      updates the correlation data set based upon the newly related data; and
      updates the predictability value in response to the second outcome data set; and
   at least one artificial agent updates the estimated outcome data set based on the correlation data set as updated and at least a portion of the third intake data set to predict a future change to the third cohort over a third passage of time.

3. A non-transitory computer readable medium according to claim 1, wherein at least one predictability value is based on a multivariate landscape generated from historical data.

4. A non-transitory computer-readable medium according to claim 1, further comprising an input data module in communication with the agent factory, wherein the input data module at least one of selectively receives, selectively stores, and selectively transmits at least one input data set.

5. A non-transitory computer-readable medium according to claim 1, further comprising a management system in communication with the agent factory, wherein the management system at least one of activates and retires at least one artificial agent according to the at least one artificial agent's predictability value.

6. A non-transitory computer-readable medium according to claim 1, further comprising an output data module in communication with the agent factory, wherein the output data module selectively displays at least a portion of at least one estimated outcome data set and at least one predictability value.

7. A computer-implemented method for predictive modeling, comprising:
  receiving within an agent factory an input data set, wherein the input data set comprises at least one intake data set and at least one outcome data set, wherein:
    a first intake data set corresponds to a set of factors for a first cohort at an initial state in time; and
    a first outcome data set corresponds to a change in the set of factors for the first cohort after a passage of time;
  generating within the agent factory a plurality of artificial agents, wherein at least one artificial agent comprises a predictive algorithm;
  determining within each artificial agent a correlation data set relating at least a portion of the first outcome data set with at least a portion of the first intake data set for predicting a future change to a second cohort over a second passage of time based on a second intake data set corresponding to a second set of factors for the second cohort at a second initial state in time; and
  determining within each artificial agent a predictability value for quantifying an accuracy of the correlation data set produced by the artificial agent.

8. A computer-implemented method according to claim 7, further comprising:
  updating within at least one artificial agent the estimated outcome data set, wherein:
    the input data set comprises a second outcome data set corresponding to an actual change in the second set of factors for the second cohort after the second passage of time;
    the input data set further comprises a third intake data set corresponding to a set of factors for a third cohort at a third initial state in time;
    each artificial agent:
      relates at least a portion of the second intake data set with at least a portion of the second outcome data set;
      updates the correlation data set based upon the newly related data; and
      updates the predictability value in response to the second outcome data set; and
    the estimated outcome data set is updated based on the correlation data set as updated and at least a portion of the third intake data set to predict a future change to the third cohort over a third passage of time.

9. A computer-implemented method according to claim 7, wherein at least one predictability value is based on a multivariate landscape generated from historical data.

10. A computer-implemented method according to claim 7, further comprising:
  at least one of selectively receiving, selectively storing, and selectively transmitting at least one input data set via an input data module, wherein the input data module is in communication with the agent factory.

11. A computer-implemented method according to claim 7, further comprising:
  at least one of activating and retiring at least one artificial agent according to the predictability value via a management system, wherein the management system is in communication with the agent factory.

12. A computer-implemented method according to claim 7, further comprising:
  displaying at least one estimated data set and at least one predictability value via an output data module, wherein the output data module is in communication with the agent factory.

13. A computer-implemented method for candidate screening, comprising:
  receiving within an agent factory an input data set, wherein the input data set comprises at least one of an intake data set and an outcome data set, wherein:
    a first intake data set corresponds to a set of factors for a first cohort at an initial state in time; and
    a first outcome data set corresponds to a change in the set of factors for the first cohort after a passage of time;
  generating within the agent factory a plurality of artificial agents, wherein at least one artificial agent comprises a predictive algorithm;
  determining within each artificial agent a correlation data set relating at least a portion of the first outcome data set with at least a portion of the first intake data set for predicting a future change to a second cohort over a second passage of time based on a second intake data set corresponding to a second set of factors for the second cohort at a second initial state in time;
  determining within each artificial agent a predictability value for quantifying an accuracy of the correlation data set produced by the artificial agent.

14. A computer-implemented method according to claim 13, further comprising:
  updating within at least one artificial agent the estimated outcome data set, wherein:
    the input data set comprises a second outcome data set corresponding to an actual change in the second set of factors for the second cohort after the second passage of time;
    the input data set further comprises a third intake data set corresponding to a set of factors for a third cohort at a third initial state in time;
    each artificial agent:
      relates at least a portion of the second intake data set with at least a portion of the second outcome data set;
      updates the correlation data set based upon the newly related data; and
      updates the predictability value in response to the second outcome data set; and
    the estimated outcome data set is updated based on the correlation data set as updated and at least a portion of the third intake data set to predict a future change to the third cohort over a third passage of time.

15. A computer-implemented method according to claim 13, wherein at least one predictability value is based on a multivariate landscape generated from historical data.

16. A computer-implemented method according to claim 13, further comprising:
  at least one of selectively receiving, selectively storing, and selectively transmitting at least one input data set via an input data module, wherein the input data module is in communication with the agent factory.

17. A computer-implemented method according to claim 13, further comprising:
at least one of activating and retiring at least one artificial agent according to the predictability value via a management system, wherein the management system is in communication with the agent factory.

18. A computer-implemented method according to claim 13, further comprising:
displaying at least one estimated data set and at least one predictability value via an output data module, wherein the output data module is in communication with the agent factory.

* * * * *